3,389,574
MULTIPLE-EFFECT ABSORPTION REFRIGERATION SYSTEMS WITH REFRIGERANT ECONOMIZERS
William L. McGrath, Syracuse, N.Y., assignor to Carrier Corporation, Syracuse, N.Y., a corporation of Delaware
Filed May 31, 1967, Ser. No. 642,405
8 Claims. (Cl. 62—101)

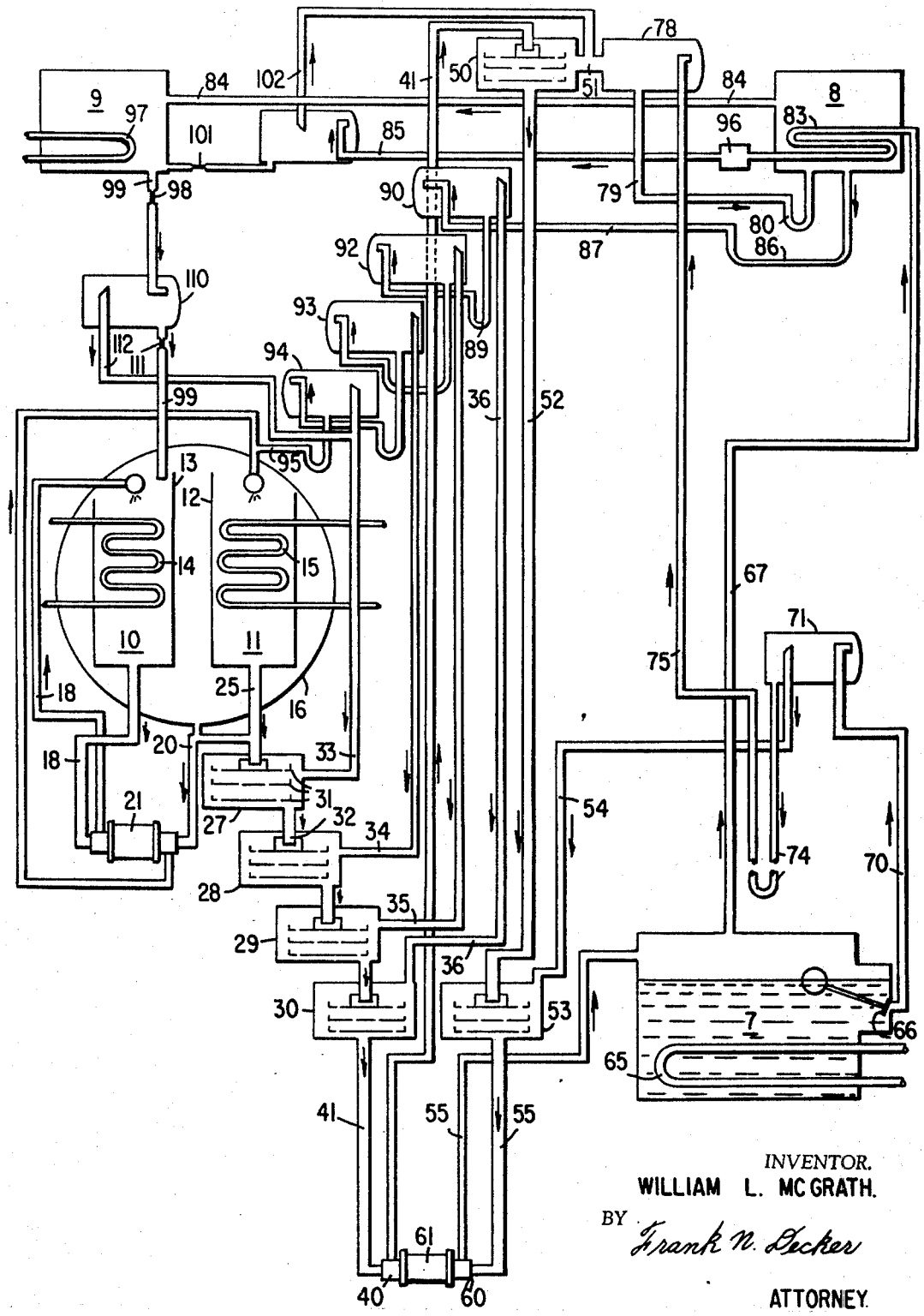

ABSTRACT OF THE DISCLOSURE

A double-effect absorption refrigeration system having a primary absorber, a primary evaporator, a high pressure generator, a low pressure generator, a high pressure condensing section, and a low pressure condenser, connected to provide refrigeration. A plurality of auxiliary absorber stages are connected in a weak solution line between the primary absorber and the high pressure generator. A plurality of auxiliary evaporator stages are connected in an intermediate solution line between the high pressure generator and the low pressure generator, and a plurality of auxiliary evaporator stages are connected in a strong solution line between the low pressure generator and the primary absorber. Stages of the auxiliary evaporators are connected by refrigerant vapor passages with the auxiliay absorbers so as to simultaneously concentrate and cool absorbent solution leaving the generator while also simultaneously heating and diluting weak solution passing to the generators. A high pressure refrigerant economizer is employed to evaporate a portion of the refrigerant condensed in the high pressure condenser to cool the remaining refrigerant therein, and the refrigerant vapor is passed to one of the auxiliary absorbers to further dilute and cool solution therein. A low pressure refrigerant economizer is employed to evaporate a portion of the refrigerant condensed in the low pressure condenser to cool the remainder thereof, and the vapor formed therein is passed to another auxiliary absorber to cool and dilute weak solution.

Cross references to related applications

This application claims subject matter disclosed in my co-pending application Ser. No. 642,369 filed concurrently herewith.

Background of the invention

This invention relates to multiple-effect absorption refrigeration systems, wherein the heat of the refrigerant vapor formed in a high pressure generator stage is extracted from a high pressure condenser to supply heat to a low pressure generator to form additional low pressure refrigerant vapor.

In previously known systems, both the high pressure refrigerant condensate from the high pressure condenser and the low pressure refrigerant condensate from the low pressure condenser are at a substantially higher temperature and pressure than that in the primary evaporator. Consequently, passage of the refrigerant condensate from the condensers to the primary evaporator has resulted in increasing the absorber load and decreasing the capacity of the machine as well as its operating economy by requiring that the excess heat of the refrigerant condensate be absorbed in the primary absorber without performing useful work.

In a system in accordance with this invention, the excess heat of the refrigerant condensate is largely re-used in the system to provide useful heating of weak solution passing to the generators, thereby effecting increased capacity and significantly improved operating economy.

Summary of the invention

To achieve the objects of this invention, the high pressure refrigerant economizer is disposed in a high pressure refrigerant liquid condensate passage extending from the high pressure condenser to the low pressure condenser. A low pressure refrigerant economizer is disposed in a low pressure refrigerant condensate liquid passage extending between the low pressure condenser and the primary evaporator. A high pressure auxiliary absorber and a low pressure auxiliary absorber are connected in series in a weak absorbent solution passage extending between the primary absorber and the high pressure generator. Refrigerant vapor passages extend between the high pressure refrigerant economizer and the high pressure auxiliary absorber and between the low pressure refrigerant economizer and the low pressure auxiliary absorber.

A portion of the high pressure refrigerant condensate is evaporated in the high pressure refrigerant economizer to cool the remaining condensate passing to the low pressure condenser. The vapor thus formed carries excess heat from the high pressure refrigerant condensate and is absorbed into weak solution in the high pressure auxiliary absorber. The heat carried by the refrigerant vapor provides useful preheating of the weak absorbent solution passing to the high pressure generator, and at the same time the operation of the system is improved by the dilution of the weak absorbent solution caused by absorption of the vapor therein.

Refrigerant liquid from the high pressure refrigerant economizer is passed into a low pressure zone, such as the low pressure condenser, where a portion of it is evaporated to cool the remainder thereof. The refrigerant vapor thus formed is recondensed in the low pressure condenser to again form liquid refrigerant by heat exchange with a cooling medium.

A portion of the low pressure refrigerant liquid condensate is evaporated in the low pressure refrigerant economizer to cool the remainder of the refrigerant therein. The heat of vaporization of the low pressure refrigerant is carried by the vapor into the low pressure auxiliary absorber where the vapor serves to dilute and preheat the weak absorbent solution to similarly effect operating economy.

The system herein described significantly improves the operating economy of a double-effect absorption refrigeration system by reducing the cooling load on the absorber because substantial excess heat is removed from the liquid refrigerant prior to its passage to the primary evaporator. Furthermore, the excess heat removed from the liquid refrigerant in the refrigerant economizers is utilized to preheat weak absorbent solution passing from the primary absorber to the high pressure generator, thus lessening the required heat input to the high pressure generator. Furthermore, since absorption of the refrigerant vapor into the weak solution further dilutes it prior to its passage to the high pressure generator, the amount of heat necessary and the temperature required to boil the diluted absorbent solution of the high pressure generator is reduced. This has the further advantage of lessening corrosion problems by reducing the absorbent concentrations and the solution temperatures in the generators and allows use of less expensive materials in the generator.

Brief description of the drawing

The drawing illustrates a schematic cross-section through a double-effect absorption refrigeration system in accordance with a preferred embodiment of this invention.

Description of the preferred embodiment

Referring to the drawing, there is shown a multiple-effect absorption refrigeration system of a type having two effects and which may use water as a refrigerant and an aqueous solution of hygroscopic salt, such as lithium bromide, as an absorbent. Various additives may be added to the solution, such as 2-ethyl hexanol, to enhance heat transfer, and lithium hydroxide to inhibit corrosion. As used herein "weak" solution refers to a solution weak in absorbent salt and absorbing power, and "strong" solution refers to a solution strong in absorbent salt and absorbing power.

The double-effect absorption system comprises a high pressure generator 7, a low pressure generator 8 having a high pressure condenser section associated therewith, a low pressure condenser 9, a primary absorber 11 and a primary evaporator 10.

Primary evaporator 10 and primary absorber 11 are preferably disposed within a single low pressure shell 16. An internal partition 12 forms a primary absorber chamber and an internal partition 13 forms a primary evaporator chamber within shell 16. A plurality of evaporator heat exchange tubes 14 are arranged within partition 13 for passage of a fluid medium, such as water, to be chilled by the refrigeration system. A plurality of absorber heat exchange tubes 15 are disposed within partition 12 and arranged for passage of a cooling medium, such as water, to a suitable heat rejection location, such as a conventional cooling tower.

Liquid refrigerant is distributed over evaporator tubes 14 and is evaporated to cool the fluid passing through the evaporator tubes. The unevaporated refrigerant liquid passes from the bottom of a sump formed by partition 13 through an evaporator recirculation pump 17 and recirculation passage 18 from which it is again distributed over evaporator tubes 14.

Cool, concentrated, strong absorbent solution is distributed over absorber tubes 15 and cooled by heat exchange with the medium passing therethrough. A portion of the absorbent solution collected in the bottom of a sump formed by partition 12 is recirculated by absorber recirculation pump 19 through recirculation line 20 from which it is again discharged over absorber tubes 15. A single electric motor 21 may operate both pumps 17 and 19.

The absorbent solution in primary absorber 11 is diluted by absorption of refrigerant vapor therein from primary evaporator 10. Cold, moderately weak absorbent solution passes through moderately weak solution passage 25 from the bottom of partition 12 and shell 16 into the first stage 27 of a low pressure auxiliary absorber. From there, the moderately weak solution passes into second stage 28, third stage 29, and fourth stage 30 of the low pressure auxiliary absorber. Each of the stages may be substantially similar and preferably comprises a plurality of perforated liquid distribution pans 31 arranged for cascading flow of liquid from one pan to the succeeding pan throughout each stage. A connecting passage 32 passes solution from first stage 27 to second stage 28 and similar connecting passages are provided between the succeeding stages. A refrigerant vapor inlet passage 33 admits refrigerant vapor to be absorbed into first stage 27, and similar refrigerant vapor inlet passages 34, 35 and 36 admit refrigerant vapor into their respective succeeding stages of the low pressure auxiliary absorber.

A low pressure weak solution pump 40 passes warm weak solution from the last stage 30 of the low pressure auxiliary absorber through weak solution passage 41 to the first stage 50 of a high pressure auxiliary absorber. First stage 50 of the high pressure auxiliary absorber may be similar in construction to first stage 27 of the low pressure auxiliary absorber and is provided with a refrigerant vapor inlet passage 51 to admit refrigerant vapor into the stage for absorption into absorbent solution therein. A connecting passage 52 passes solution from first stage 50 to a second stage 53 of the high pressure auxiliary absorber. Second stage 53 is provided with a refrigerant vapor passage 54 for admitting refrigerant vapor into the stage for absorpsion into absorbent solution therein. The resulting very weak, very warm, absorbent solution is passed through very weak solution line 55 by very weak solution pump 60 into high pressure generator 7 for concentration therein. Pumps 40 and 60 may be driven by a single electric motor 61.

High pressure generator 7 includes generator heat exchange tubes 65 for passing steam in heat exchange relation with absorbent solution therein. Other heating media may be employed, or alternatively, the generator may be directly fired by a combustible gas. The absorbent solution in generator 7 is boiled to vaporize refrigerant and to concentrate the solution. Hot intermediate strength absorbent solution passes from high pressure generator 7 through float valve 66 and intermediate solution passage 70, to the first stage 71 of a high pressure auxiliary evaporator.

Stage 71 may comprise a hollow vessel in which the incoming solution is discharged against one wall thereof to prevent carryover of liquid droplets into the vapor outlet passage. Refrigerant vapor passage 54 terminates in the vapor space within high pressure auxiliary evaporator stage 71. This passage conducts refrigerant vapor evaporated in high pressure auxiliary evaporator first stage 71 to the last stage 53 of the high pressure auxiliary absorber.

Intermediate solution passes from the first stage 71 of the high pressure auxiliary absorber through a solution trap 74 in passage 75 to second stage 78 of the auxiliary high pressure evaporator, which may be similarly constructed to that of the first stage 71. Refrigerant vapor passage 51 conducts refrigerant vapor from second stage 78 of the auxiliary high pressure evaporator to first stage 50 of the high pressure auxiliary absorber.

Refrigerant vapor is evaporated from the intermediate absorbent solution in the stages of the high pressure auxiliary evaporator, thereby simultaneously concentrating and cooling the hot intermediate strength solution to form moderately hot, concentrated intermediate solution. The concentrated intermediate solution passes through intermediate solution passage 79 and solution trap 80 into low pressure generator 8.

The various solution traps, such as traps 74 and 80, are designed to have a vertical height, such that the level of solution in the leg thereof connecting with the next lower pressure stage, balances the solution level and the pressure difference from the previous higher pressure zone to prevent vapor from passing between the stages.

Low pressure generator 8 comprises a combined generator-condenser and is provided with heat exchange tubes 83 which form a high pressure condenser section therein. The hot refrigerant vapor formed in high pressure generator 7 passes through high pressure refrigerant vapor passage 67 and heat exchange tubes 83 to boil the solution in the lower pressure generator while condensing the vapor within heat exchange tubes 83. The refrigerant vapor formed in the low pressure generator passes through low pressure refrigerant vapor passage 84 to low pressure condenser 9. The strong absorbent solution formed in low pressure generator 8 passes through solution trap 86 and strong solution passage 87 to the first stage 90 of an auxiliary low pressure evaporator. The refrigerant condensed in high pressure condenser tubes 83 passes through steam trap 96 to low pressure condenser 9.

First stage 90 and the succeeding stages of the low pressure auxiliary evaporator may be constructed similarly to first stage 71 of the high pressure auxiliary evaporator. Refrigerant vapor passage 36 extends from the last stage 30 of the low pressure auxiliary absorber and terminates in the vapor space in first stage 90 of the low pressure auxiliary evaporator to conduct refrigerant vapor formed in first stage 90 to last stage 30. The strong absorbent solution passes from first stage 90 of the low pressure auxiliary evaporator through solution trap 89 into second stage 92 in which additional refrigerant is evaporated from the solution. The solution then passes into succeeding stages 93 and 94 where still further evaporation of refrigerant vapor takes place. Second stage 92 of the low pressure auxiliary evaporator is in vapor communication with third stage 29 of the low pressure auxiliary absorber through refrigerant vapor passage 35, and similarly third stage 93 and fourth stage 94 are in communication with second stage 28 and first stage 27, through refrigerant vapor passages 34 and 33 respectively.

The concentrated strong absorbent solution passes from last stage 94 through a solution trap into concentrated strong solution line 95 from which it is discharged over absorber heat exchange tubes 15 in primary absorber 11.

The low pressure refrigerant vapor passes from low pressure refrigerant vapor passage 84 into low pressure condenser 9 and is condensed therein by heat exchange with a suitable cooling medium passing through condenser heat exchange tubes 97. The cooling medium rejects heat from low pressure condenser 9 to a suitable location, such as a cooling tower. Also, high pressure liquid refrigerant passes from high pressure refrigerant liquid passage 85 into low pressure condenser 9 and is partially evaporated therein by flashing, thereby cooling the remainder thereof upon being discharged in the low pressure condenser. The resulting vapor is recondensed in condenser 9.

Condensed refrigerant passes from low pressure condenser 9 through restriction 98 in low pressure refrigerant passage 99 and is discharged over evaporator heat exchange tubes 14 in primary evaporator 10.

It is preferred to employ a high pressure refrigerant economizer 100 in the high pressure refrigerant passage 85. High pressure refrigerant economizer 100 may comprise a vessel similar in construction to the auxiliary evaporator stages. A portion of the liquid refrigerant passing to the high pressure refrigerant economizer is evaporated therein to cool the remaining liquid refrigerant. The refrigerant vapor formed in the high pressure economizer passes through refrigerant vapor passage 102 into refrigerant vapor passage 51 and is absorbed in first stage 50 of the high pressure auxiliary absorber. Thus, the warm refrigerant liquid from the high pressure condenser is cooled prior to passing to the primary absorber and the refrigerant vapor formed in the high pressure economizer is absorbed into weak solution to heat and dilute the weak solution. The cooled high pressure refrigerant liquid passes through a high pressure refrigerant liquid restriction 101 to low pressure condenser 9. Steam trap 96 and restriction 101 maintain a pressure zone in the high pressure refrigerant economizer 100 intermediate the pressures in high pressure condenser 8 and low pressure condenser 9.

It is also preferred to employ a low pressure refrigerant economizer 110 in low pressure refrigerant liquid passage 99. Low pressure refrigerant economizer 110 is similar in construction to economizer 100 and vapor formed therein passes through vapor passage 112 and passage 33 into first stage 27 of the low pressure absorber. Low pressure refrigerant restriction 111 and restriction 98 are disposed in the inlet and discharge passages associated with low pressure refrigerant economizer 110 to maintain a pressure zone therein, intermediate the pressures in low pressure condenser 9 and primary evaporator 10. A portion of the low pressure liquid refrigerant is evaporated in low pressure refrigerant economizer 110 to cool the remaining refrigerant prior to its discharge over primary evaporator heat exchange tubes 14. The refrigerant vapor thus formed is absorbed into and dilutes and heats the cold moderately weak solution in first stage 27 of the low pressure auxiliary absorber. Also, the absorption refrigeration system may utilize more than two effects, and consequently the terms "high pressure," "low pressure," "strong," "weak" and "intermediate" and other similar terms are used merely for clarity to distinguish relative relationship of the components, solutions, temperatures or pressures and not as a limitation on the number of effects in the cycle.

In operation, the pressures in serially connected low pressure auxiliary absorber stages 27, 28, 29 and 30 successively increase in the direction of solution flow therethrough from primary absorber 11 toward the high pressure auxiliary absorber and high pressure generator 7. The low pressure auxiliary absorber stages form successively increasing pressure zones intermediate the pressures in primary absorber 11 and first stage 50 of the high pressure auxiliary absorber.

Similarly, the pressure in second stage 53 of the high pressure auxiliary absorber is greater than the pressure in first stage 50 thereof. Both serially connected stages form successively increasing pressure zones intermediate the pressure in last stage 30 of the low pressure auxiliary absorber and the high pressure generator 7, in the direction of solution flow therethrough from primary absorber 11 to high pressure generator 7.

In a typical operating system, moderately weak (60%), cold (106° F.) absorbent solution from primary absorber 11 is successively diluted and heated in the stages of the low pressure auxiliary absorber by absorption of refrigerant vapor therein, to form warm (156° F.), weak (58.8%) solution which passes to the high pressure auxiliary absorber. The warm weak solution is successively further diluted and further heated by absorption of refrigerant vapor therein, as it passes through the stages of the high pressure auxiliary absorber to form very warm (245° F.), very weak (56.7%) absorbent solution which passes to high pressure generator 7.

The quantity of refrigerant which can be formed by boiling weak solution in the high pressure generator at a given temperature is greatly increased because the solution passed thereto is very weak in absorbent salt. Thus, a low generator temperature becomes feasible by use of this invention. In addition, very weak solution results in a much lower corrosion rate of metal parts in the high pressure generator than would occur with stronger solution at the same temperature level. It is also important to note that while the auxiliary absorbers perform both a dilution and a heating function to make these advantages possible, they achieve this result without employing expensive heat exchange tube surface and so possess a significan cost advantage over conventional solution heat exchangers.

The hot (307° F.), intermediate strength (58.7%) absorbent solution from the high pressure generator is further concentrated as it passes through the high pressure auxiliary evaporators by the evaporation of refrigerant vapor therein. At the same time, not only is the concentration of the solution increased, but its temperature is reduced so that only moderately hot (220° F.) but concentrated (60.7%) intermediate solution passes into the low pressure generator. Again, these advantages are achieved without employing expensive heat transfer surface and at a relatively low temperature so that corrosion problems are minimized.

The absorbent solution is further cooled and concentrated by evaporation of refrigerant therefrom in the low pressure generator and the moderately cool (190° F.), strong solution (63.3%) is serially passed through the stages of the low pressure auxiliary evaporator. Still further, refrigerant vapor is evaporated from the strong solution in the low pressure auxiliary evaporator stages. The solution is further cooled, due ot the evaporation of refrigerant therefrom and the cool (145° F.), concentrated strong solution (64.5%) is passed to the primary absorber to absorb refrigerant vapor therein.

If desired, either or both of the refrigerant economizers may include plural stages. Also, the refrigerant economizers may be incorporated into a unitary shell with the auxiliary absorbers. For example, they may comprise open pans or passages in the auxiliary absorber shells. In another embodiment, the liquid refrigerant from the high pressure refrigerant economizer may be passed to a low pressure evaporating zone in communication with the low pressure condenser. It is preferred however, to take advantage of the simplicity of employing the low pressure condenser as a low pressure evaporating zone wherein liquid refrigerant from the high pressure economizer is evaporated and recondensed piror to passage thereof to the low pressure refrigerant economizer.

The use of refrigerant economizers in accordance with this invention reduces the quantity of heat in the refrigerant liquid condensate passed into the primary evaporator. Consequently, the refrigerant economizers lessen the quantity of useless heat which must be absorbed and rejected through the primary absorber. Stated in another way, a greater proportion of the refrigerant is available to provide useful cooling in the primary evaporator, because the refrigerant contains less superheat, and consequently less refrigerant need be evaporated to provide the necessary but non-useful cooling of the refrigerant itself in the primary evaporator.

Of equal importance, however, is the fact that a system in accordance with this invention transfers the useless superheat of the condensed liquid refrigerant and passes it to the auxiliary absorbers, where it usefully serves to preheat absorbent solution passing to the generators. Furthermore, because the absorption of the refrigerant vaporized in the refrigerant economizers, dilutes the absorbent solution passing to the high pressure generator, the high temperature generator may operate at a lower temperature than heretofore required in similar systems. Not only is the corrosion rate in the high temperature generator reduced because of the lower temperature required therein but it is also reduced because of the low concentration of the absorbent salt in the diluted solution passed thereinto. Thus, the need for expensive corrosion resistant materials in the generator is lessened and the cost of the machine is thereby reduced.

Still another advantage of employing this invention is the reduced flashing of refrigerant which occurs when it is discharged into the primary evaporator. Normally, elaborate and expensive eliminators are required to prevent this refrigerant from flashing so as to produce physical carryover of evaporated liquid refrigerant droplets into the primary absorber. It is obvious that carryover of unevaporated refrigerant results in a loss of useful refrigeration. In accordance with this invention, the superheat in the liquid refrigerant discharged in the primary evaporator is reduced, thus resulting in less stringent eliminator requirements and a corresponding reduction in their cost. Similarly, the flashing of refrigerant in the low pressure condenser is reduced due to cooling in the high pressure refrigerant economizer.

It will be seen therefore that the application of this invention in a double-effect absorption refrigeration system results in higher capacity, lower operating costs and higher coefficient of performance.

It will be appreciated that various modifications and embodiments of this invention may be made within the scope of the following claims.

I claim:
1. An absorption refrigeration system comprising:
    (A) a primary absorber;
    (B) a primary evaporator;
    (C) a high pressure generator;
    (D) a low pressure generator having a high pressure condenser section associated therewithin;
    (E) a low pressure condenser;
    (F) weak solution passage means for passing weak absorbent solution from said primary absorber to said high pressure generator for concentration therein;
    (G) intermediate solution passage means for passing intermediate strength absorbent solution from said high pressure generator to said low pressure generator for further concentration therein;
    (H) strong solution passage means for passing strong absorbent solution from said low pressure generator to said primary absorber for absorption of refrigerant vapor therein;
    (I) high pressure refrigerant vapor passage means for passing high pressure refrigerant vapor formed in said high pressure generator through the high pressure condenser section of said low pressure generator for condensing said vapor and heating solution in said low pressure generator;
    (J) low pressure refrigerant vapor passage means for passing low pressure refrigerant vapor formed in said low pressure generator to said low pressure condenser for condensing said vapor;
    (K) low pressure refrigerant liquid passage means for passing condensed refrigerant from said low pressure condenser to said primary evaporator for evaporation therein;
    (L) high pressure refrigerant liquid passage means for passing high pressure liquid refrigerant from said high pressure condenser to a low pressure zone;
    (M) refrigerant vapor passage means for passing evaporated refrigerant from said primary evaporator to said primary absorber for absorption into absorbent solution;
wherein the improvement comprises:
    (N) a high pressure auxiliary absorber in said weak solution passage between said primary absorber and said high pressure generator;
    (O) a high pressure refrigerant economizer for evaporating a portion of liquid refrigerant therein while cooling the remainder thereof, said high pressure referigerant economizer being disposed in said high pressure refrigerant liquid passage, and having a pressure therein intermediate the pressures in said high pressure condenser and said low pressure zone and substantially equal to the pressure in said high pressure auxiliary absorber; and
    (P) refrigerant vapor passage means for passing refrigerant vapor evaporated in said high pressure refrigerant economizer to said high pressure auxiliary absorber for absorption into weak solution therein, to thereby heat and dilute said weak solution prior to passage thereof to said high pressure generator.

2. An absorber refrigeration system as defined in claim 1 including:
    (A) a low pressure auxiliary absorber, disposed in said weak solution passage between said primary absorber and said high pressure auxiliary absorber and having a pressure therein intermediate the pressures in said primary absorber and said high pressure auxiliary absorber;
    (B) a low pressure refrigerant economizer for evaporating a portion of refrigerant therein to cool the remainder thereof, said low pressure refrigerant economizer being disposed in the low pressure refrigerant liquid passage between said low pressure condenser and said primary evaporator, and having a pressure therein intermediate the pressures in said low pressure condenser and said primary evaporator and substantially the same as the pressure in said auxiliary absorber; and
    (C) a refrigerant vapor passage connecting said low pressure refrigerant economizer and said low pressure auxiliary absorber for passing refrigerant vapor evaporated in said low pressure refrigerant economizer to said auxiliary absorber for adsorption therein, to thereby heat and dilute the weak solution in said low pressure auxiliary absorber prior to passage thereof to said high pressure auxiliary absorber.

3. An absorption refrigeration system as defined in claim 1 wherein said low pressure zone to which high pressure liquid refrigerant is passed comprises said low pressure condenser, and liquid refrigerant is passed thereto from said high pressure refrigerant enonomizer so that a portion of said liquid refrigerant from said high pressure refrigerant economizer is vaporized and recondensed in said low pressure refrigerant condenser to cool the remainder thereof.

4. An absorption refrigeration system as defined in claim 1 wherein:
   (A) the low pressure zone to which high pressure liquid refrigerant is passed comprises said low pressure condenser, liquid refrigerant being passed to said low pressure condenser from said high pressure refrigerant economizer so that a portion of said liquid refrigerant from said high pressure refrigerant economizer is vaporized and recondensed in said low pressure refrigerant condenser to cool the remainder thereof, the cooled remaining refrigerant, the recondensed refrigerant, and the condensed high pressure vapor being collected in said low pressure refrigerant condenser and being passed therefrom through said low pressure refrigerant liquid passage;
   (B) a low pressure auxiliary absorber, disposed in said weak solution passage between said primary absorber and said high pressure auxiliary absorber and having a pressure therein intermediate the pressures in said primary absorber and said high pressure auxiliary absorber;
   (C) a low pressure refrigerant economizer for evaporating a portion of refrigerant therein to cool the remainder thereof, said low pressure refrigerant economizer being disposed in the low pressure refrigerant liquid passage between said low pressure condenser and said primary evaporator, and having a pressure therein intermediate the pressures in said low pressure condenser and said primary evaporator and substantially the same as the pressure in said auxiliary absorber; and
   (D) a refrigerant vapor passage connecting said low pressure refrigerant economizer and said low pressure auxiliary absorber for passing refrigerant vapor evaporated in said low pressure refrigerant economizer to said auxiliary absorber for absorption therein, to thereby heat and dilute the weak solution in said low pressure auxiliary absorber prior to passage thereof to said high pressure auxiliary absorber.

5. A method of producing refrigeration from an asborption refrigeration system having a primary absorber, a primary evaporator, a high pressure generator, a low pressure generator associated with a high pressure condenser, and a low pressure condenser, operatively connected to form a multiple-effect absorption refrigeration system, the steps comprising:
   (A) evaporating refrigerant in the primary evaporator to provide cooling, and absorbing the evaporated refrigerant in an absorbent solution in said primary absorber, thereby forming weak absorbent solution;
   (B) heating said weak absorbent solution in the high pressure generator to form intermediate strength asborbent solution and high pressure refrigerant vapor;
   (C) heating intermediate strength solution in said low temperature generator by condensing high pressure refrigerant vapor in said high pressure condenser in heat exchange relation with intermediate strength solution in said low pressure generator to form strong absorbent solution and low pressure refrigerant vapor;
   (D) condensing said low pressure refrigerant vapor in said low temperature condenser; and
   (E) passing said strong solution to said primary absorber for reabsorption of refrigerant vapor and passing condensed refrigerant to said primary evaporator for re-evaporation thereof;
   (F) passing liquid refrigerant from said high pressure condenser to said primary evaporator, and passing liquid refrigerant from said low pressure condenser to said primary evaporator, for evaporation therein;
wherein the improvement comprises:
   (G) evaporating a portion of the liquid refrigerant passed from said high pressure condenser to said primary evaporator, prior to passage thereof to said primary evaporator, in a high pressure evaporating zone having a pressure intermediate the pressures in said high pressure condenser and said primary evaporator, thereby cooling the remaining liquid refrigerant in said zone; and
   (H) absorbing the refrigerant vapor evaporated in said evaporating zone in weak solution passing from said primary absorber to said high pressure generator in a high pressure absorbing zone having a pressure intermediate the pressures in said primary absorber and said high pressure generator and having a pressure substantially equal to the pressure in said high pressure evaporating zone, thereby heating and diluting weak solution passing from said primary absorber prior to passing into said high pressure generator.

6. A method of producing refrigeration as defined in claim 5 including the steps of:
   (A) evaporating a portion of the liquid refrigerant passed from said low pressure condenser to said primary evaporator, prior to passage thereof to said primary evaporator, in a low pressure evaporating zone having a pressure intermediate the pressures in said low pressure condenser and said primary evaporator, thereby cooling the remaining liquid refrigerant; and
   (B) absorbing the refrigerant vapor evaporated in said low pressure evaporating zone in weak absorbent solution passing from said primary absorber to said high pressure absorbing zone in a low pressure absorbing zone having a pressure intermediate the pressures in said primary absorber and said high pressure absorbing zone and having a pressure substantially equal to the pressure in said low pressure evaporating zone, thereby heating and diluting absorbent solution passing from said primary absorber prior to passing into said high pressure absorbing zone.

7. A method of producing refrigeration as defined in claim 5 including the steps of passing liquid refrigerant from said high pressure evaporating zone to said low pressure condenser prior to passage thereof to said primary evaporator; evaporating a portion of the liquid refrigerant passed to said low pressure condenser therein, thereby cooling the remainder thereof; and recondensing the refrigerant evaporated in said low pressure condenser therein.

8. A method of producing refrigeration as defined in claim 5 including the steps of:
   (A) passing liquid refrigerant from said high pressure evaporating zone to said low pressure condenser prior to passage thereof to said primary evaporator;
   (B) evaporating a portion of the liquid refrigerant passed to said low pressure condenser therein, thereby cooling the remainder thereof;
   (C) recondensing the refrigerant evaporated in said low pressure condenser therein;
   (D) passing refrigerant condensed in said low pressure condenser and refrigerant passed thereto from said high pressure condenser to a low pressure evaporating zone prior to passage thereof to said primary evaporator, said low pressure evaporating zone having a pressure therein intermediate the pressures in said low pressure condenser and said primary evaporator;
   (E) evaporating a portion of the liquid refrigerant passed from said low pressure condenser to said low pressure evaporating zone therein, thereby cooling the remaining liquid refrigerant; and (F) absorbing the refrigerant vapor evaporated in said low pressure evaporating zone in weak absorbent solution passing from said primary absorber to said high pressure absorbing zone, in a low pressure absorbing zone having a pressure therein, intermediate the pressures in said primary absorber and said high pressure absorbing zone and having a pressure substantially equal to the pressure in said low pressure evaporating zone, thereby heating and diluting the absorbent solution passing from said primary absorber prior to passing into said high pressure absorbing zone.

References Cited

UNITED STATES PATENTS

| | | | |
|---|---|---|---|
| 2,283,213 | 5/1942 | Katzow | 62—484 X |
| 2,755,635 | 7/1956 | Bourne | 62—101 |
| 3,175,371 | 3/1965 | Harwich | 62—101 |
| 3,266,266 | 8/1966 | Reid | 62—476 |
| 3,273,350 | 9/1966 | Taylor | 62—101 |
| 3,287,928 | 11/1966 | Reid | 62—476 |
| 3,316,727 | 5/1967 | Bourne | 62—101 |

LLOYD L. KING, *Primary Examiner.*